(12) United States Patent
Brown et al.

(10) Patent No.: US 9,015,720 B2
(45) Date of Patent: Apr. 21, 2015

(54) EFFICIENT STATE TRANSITION AMONG MULTIPLE PROGRAMS ON MULTI-THREADED PROCESSORS BY EXECUTING CACHE PRIMING PROGRAM

(75) Inventors: Andrew Brown, Berkeley, CA (US); Brian Emberling, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1201 days.

(21) Appl. No.: 12/349,227

(22) Filed: Jan. 6, 2009

(65) Prior Publication Data

US 2009/0276777 A1  Nov. 5, 2009

Related U.S. Application Data

(60) Provisional application No. 61/049,156, filed on Apr. 30, 2008.

(51) Int. Cl.
*G06F 9/46* (2006.01)
*G06F 9/48* (2006.01)
*G06F 9/38* (2006.01)

(52) U.S. Cl.
CPC ............ *G06F 9/4843* (2013.01); *G06F 9/3802* (2013.01); *G06F 9/383* (2013.01); *G06F 9/3842* (2013.01); *G06F 9/3851* (2013.01)

(58) Field of Classification Search
USPC .................... 718/101, 103, 108; 719/E9.053, 719/E9.054; 712/215, 228, 207, 237
See application file for complete search history.

(56) References Cited

U.S. PATENT DOCUMENTS

| | | | | |
|---|---|---|---|---|
| 6,101,595 | A * | 8/2000 | Pickett et al. | 712/205 |
| 6,272,516 | B1 * | 8/2001 | Angle et al. | 718/102 |
| 6,845,501 | B2 * | 1/2005 | Thompson et al. | 717/140 |
| 6,965,982 | B2 * | 11/2005 | Nemawarkar | 712/207 |
| 7,028,142 | B2 * | 4/2006 | Mes | 711/137 |
| 7,240,144 | B2 * | 7/2007 | Tran et al. | 711/5 |
| 7,290,089 | B2 * | 10/2007 | Parthasarathy et al. | 711/118 |
| 7,328,329 | B2 * | 2/2008 | Di Gregorio et al. | 712/214 |
| 7,343,477 | B1 * | 3/2008 | Thatipelli et al. | 712/218 |

(Continued)

OTHER PUBLICATIONS

Brown, Andrew et al. Pending U.S. Appl. No. 11/882,305. Thread Sequencing for Multi-Threaded Processor With Instruction Cache. Application Filing Date: Jul. 31, 2007.

*Primary Examiner* — Meng An
*Assistant Examiner* — Abu Ghaffari
(74) *Attorney, Agent, or Firm* — Volpe and Koenig, P.C.

(57) ABSTRACT

A system and method to optimize processor performance and minimizing average thread latency by selectively loading a cache when a program state, resources required for execution of a program or the program itself change, is described. An embodiment of the invention supports a "cache priming program" that is selectively executed for a first thread/program/sub-routine of each process. Such a program is optimized for situations when instructions and other program data are not yet resident in cache(s), and/or whenever resources required for program execution or the program itself changes. By pre-loading the cache with two resources required for two instructions for only a first thread, average thread latency is reduced because the resources are already present in the cache. Since, such a mechanism is carried out only for one thread in a program cycle, pitfalls of a conventional general pre-fetch scheme that involves parsing of the program in advance to determine which resources and instructions will be needed at a later time, are avoided.

9 Claims, 3 Drawing Sheets

(56) References Cited

U.S. PATENT DOCUMENTS

| | | |
|---|---|---|
| 7,369,912 B2 * | 5/2008 | Sherriff et al. ............... 700/100 |
| 7,441,101 B1 * | 10/2008 | Steiss et al. .................. 712/205 |
| 7,496,916 B2 * | 2/2009 | Dettinger et al. ............ 718/100 |
| 7,516,302 B2 * | 4/2009 | Peter ............................... 712/34 |
| 7,594,096 B2 * | 9/2009 | Eickemeyer et al. ........ 712/207 |
| 7,730,263 B2 * | 6/2010 | Burtscher et al. ............ 711/137 |
| 7,761,863 B2 * | 7/2010 | Illowsky et al. .............. 717/167 |
| 7,793,040 B2 * | 9/2010 | Bittner, Jr. .................... 711/108 |
| 7,797,520 B2 * | 9/2010 | Grandou et al. .............. 712/237 |
| 2005/0210472 A1 * | 9/2005 | Accapadi et al. ............ 718/105 |
| 2006/0150186 A1 * | 7/2006 | Grayver ........................ 718/102 |
| 2009/0138880 A1 * | 5/2009 | Yafimau ........................ 718/103 |

\* cited by examiner

Thread 0: <fetch A............><execute X using A><fetch B............><execute Y using B>
Thread 1:       <fetch A><execute X using A><fetch B><execute Y using B>
Thread 2:         <fetch A><execute X using A><fetch B><execute Y using B>

FIG. 1
(Conventional Mechanism)

Thread 0: <fetch A and B............><execute X using A><execute Y using B>
Thread 1: Normal  <fetch A><execute X using A><fetch B><execute Y using B>
Thread 2: Program <fetch A><execute X using A><fetch B><execute Y using B>

Cache Priming Program

EFFICIENT STATE TRANSITION AMONG MULTIPLE PROGRAMS ON MULTI-THREADED PROCESSORS BY EXECUTING CACHE PRIMING PROGRAM

CROSS REFERENCE TO RELATED APPLICATIONS

The present application claims the benefit of U.S. Provisional Patent Application No. 61/049,156 filed on Apr. 30, 2008, which is incorporated by reference herein in its entirety.

BACKGROUND OF THE INVENTION

1. Field of the Invention

The invention described herein relates to efficient usage of processor resources and for reducing average thread latency.

2. Background Art

Consider a multi-threaded multi-program streaming processor where threads must complete in the order they are created and instructions must be loaded into a local instruction cache from a memory device. In order to reduce instruction latency, instruction misses, and thereby the total resources (memory, per-thread buffers, etc.) in use at any time by the set of existing threads, instructions for older threads are typically executed before instructions for newer threads. Before an instruction is executed for a new program, instruction data must be loaded into the instruction cache from the memory device. This is a high latency operation and multi-threaded processors will typically switch to another thread while this load occurs in order to achieve maximum use of processor computational resources. If instructions for older threads running an older program are scheduled before instructions for newer threads with a new program, then the waiting period caused by an instruction fetch may be deferred until operations, such as loading resources required for execution into cache(s), have been completed for these older threads. The result is that when processor resources become free the instructions that will use these resources for newer threads have not yet been loaded into the instruction cache (or constants into data caches, etc.), and the processor resources will go unused until the high-latency instruction fetch has completed. Instruction data is not the only data that a processor may have to wait for after a state transition; constant data shared by threads in a program may also need to be reloaded when the program state changes.

One typically implemented method to avoid leaving processor resources unused during an instruction or data fetch is to pre-fetch instructions or data into a cache prior to execution. This often involves parsing in advance a program that is to be executed to determine which resources and instructions will be needed at a later time. However, doing so in a brute force manner for every thread of a program generally requires significant additional hardware complexity and chip area.

Figure 1:
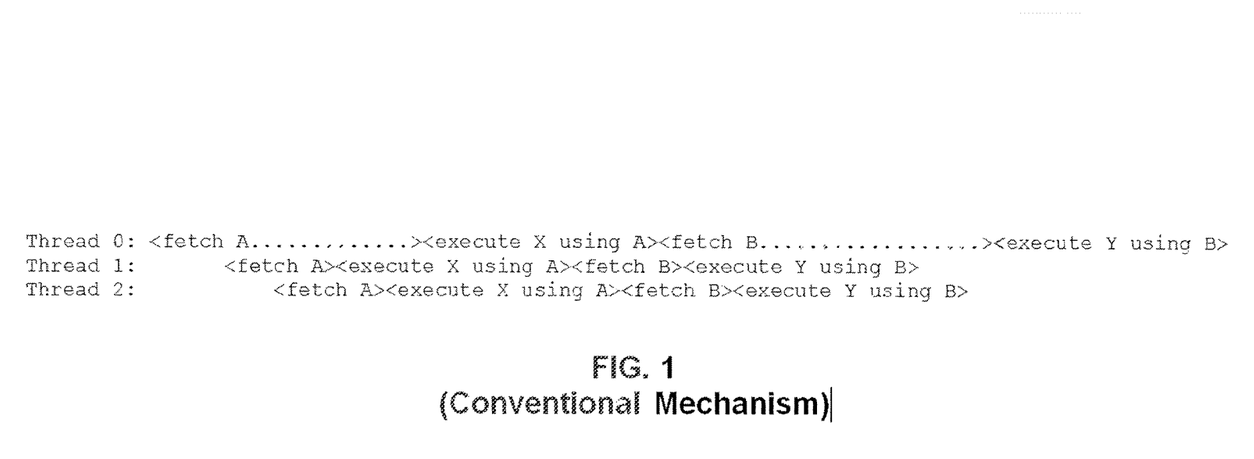
FIG. 1 illustrates a conventional execution of a first program by loading one resource for each instruction every time.

In an exemplary scenario, a program running two instructions X and Y is shown in FIG. 1. For the sake of discussion and not as a limitation, it is assumed herein that instruction X needs resource A and instruction Y needs resource B. In a typical scenario, X, Y, A and B can remain same between subsequent executions of the same thread ("thread 0"), though other inputs to thread 0 may vary between various time intervals, as is well known to those skilled in the art. Under normal circumstances, a fetch A operation for the first thread is performed, then instruction X is executed using A, and subsequently resource B is fetched and instruction Y is executed using B. Once resources A and B are loaded into the cache, these can be used by subsequent threads of same or any other programs, as and when necessary. However, in such a normal scenario, instruction Y cannot be executed fast enough and not immediately after instruction X has been executed because resource B is not fetched and loaded into the cache until instruction X completes execution. Similar situation exists for subsequent threads ("thread 1" and "thread 2") which can also start in a staggered fashion, as and when various inputs and resources arrive, as shown in FIG. 1.

In a conventional system, when the first thread 0 is started using a normal program, instructions X and Y and resources A and B are likely to be not present in a cache. Thus, if instructions X and Y are to be executed in order, resource A is first fetched when thread 0 is started. Subsequently, instruction X is executed using resource A. Similarly, resource B needed to execute instruction Y is fetched after instruction X completes execution, and so on for additional instructions. A similar procedure occurs for subsequent threads, threads 1 and 2. Therefore, in such a scenario described in FIG. 1, the processor resources go idle because resource B has not yet loaded into the cache. This leads to an undesirable latency.

Accordingly, there is a need for a method and system that allows for minimizing the amount of time a cache is idle. A desired solution would have to avoid the pitfalls of a pre-fetch scheme, while otherwise addressing the above described latency problems in the caching of instructions and data.

Further embodiments, features, and advantages of the present invention, as well as the operation of the various embodiments of the present invention, are described below with reference to the accompanying drawings.

DETAILED DESCRIPTION OF THE INVENTION

An exemplary embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

According to one embodiment of the invention, a mechanism is proposed where processor hardware may execute two different programs that implement a given shader program. One of these two programs performs certain expensive functions (such as performing an extra fetch) for a first thread (or other batch of input data, perhaps in multiple threads) only, thereby resulting in a faster overall execution, as will be described below. The first program is referred to herein as the "cache priming program." Such a first program has a first batch of data. The second program, having corresponding subsequent batches of data, performs normal fetch and execute operations wherein normal loading of cache occurs, similar to operations described in FIG. 1. Further, the first program runs faster and uses less resources itself, than the second program when those resources are in cache, and also causes later threads using the loaded resources to finish faster, or even use lesser resources. Such resources may be instructions or data or a combination of the two.

Situations may exist when data has not yet been loaded into certain caches when a new program execution starts, or when other program constant data changes. In these situations, a different organization of the program may complete in less time, even if, under other circumstances, it might take more execution time and use more resources. An embodiment of the invention supports a "cache priming program" that is selectively executed for a first thread/program/sub-routine of each process. Such a program is optimized for situations when instructions and other program data are not yet resident in cache(s), and/or whenever resources required for program execution or the program itself changes. This program may simply execute a single extra fetch for the first thread of a program before beginning regular instruction fetch cycles, or it may execute an entirely different program, or it may share instructions with an earlier originally executed/partially executed program. Depending on how the program is organized, the processor's instruction scheduler may be able to load multiple caches in parallel, and may even execute one or more dummy instructions/sub-routines (instructions that do no work and generate no output) other than to load data and instruction caches prior to when their data is actually needed. Executing dummy instructions could be expensive to do for every thread, but if the processor is executing them just for the first thread after a change of state, this consumes only minimal extra resources. Under certain conditions, using, a dummy instruction can be one of the ways to implement this program. Further, according to various embodiments of the present invention, cache misses are taken in parallel rather than in series, although this is not a limitation.

Exemplary Embodiments

Figure 2:
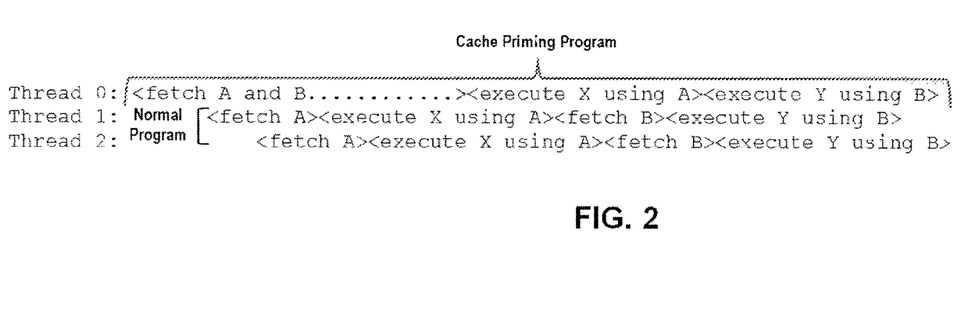
FIG. 2 is a block diagram illustrating an exemplary preloading of the cache at the beginning of execution of a first thread of a program.

FIG. 2 illustrates an exemplary embodiment of the present invention. In the exemplary scenario described above, multiple programs (or multiple threads of the same program or process, as the case might be) may be executing and utilizing cache space.

Data is read from the cache or is written into the cache during various instances of the two programs. For the sake of a simpler description and not as a limitation, it is assumed herein that instructions X and Y both require resources A and B, respectively, to complete their execution. Note that although two programs are being described here, various embodiments of the invention can be equally well realized by using more than two programs.

In FIG. 2, during certain selective time instants, the processor can execute two programs at the same time for the same related functionality. However, one of the programs will load the cache with two resources by adding an extra fetch at a beginning of the first fetch cycle of the first thread ("thread 0," also interchangeably referred to herein as the priming thread).

As shown in FIG. 2, according to one embodiment of the present invention, resources A and B are both fetched and loaded into a cache by the "cache priming program." The availability of both resources A and B for executions of instructions X and Y, assures that the processor resources, such as Arithmetic Logic Units or ALUs (not shown) are idle for a minimal time. By doing so, once execution of instruction X is completed, execution of instruction Y using resource B can be started immediately because resource B is already available. Subsequent threads can be executing in a normal fashion by fetching executing, fetching, and so on and at the same time utilizing any resources that may have been preloaded in the cache by the first thread ("thread 0"). So every thread after a first priming thread can take advantage of this embodiment of the invention, depending upon available resources and hardware. By executing such a cache priming program for at least the first thread, the processor can execute multiple instructions with minimal cache latency. As can be seen from FIG. 2, once the priming thread has loaded resources into caches, such resources will be available to newer threads and there will be a much shorter waiting time for resources for those subsequent newer threads. As a result of fetching both resources A and B at the beginning of the execution, FIG. 2 clearly shows that X and Y are executed faster than they would be if cache priming was not performed, such as that shown in FIG. 1. Such a mechanism enables execution of A and B faster as compared to the execution of A and B using conventional mechanism shown in FIG. 1.

Due to the fact that fetch B operation in FIG. 1 is much longer than in FIG. 2, average thread latency is higher in the conventional mechanism of FIG. 1 which always executes just one type of fetch and execute program associated with a graphics operation. Further, it is not a limitation of this invention for the first thread to complete instruction execution. In a multithreaded processor environment where threads can execute in parallel, instruction execution can be intermingled, and the newer threads don't have to wait for the priming thread, "thread 0," to complete before executing their instructions. In fact when the priming thread loads the resources into the cache, these resources will be available to the subsequent newer threads and those newer threads won't be waiting as long for resources, as compared to the conventional mechanism.

Figure 3:
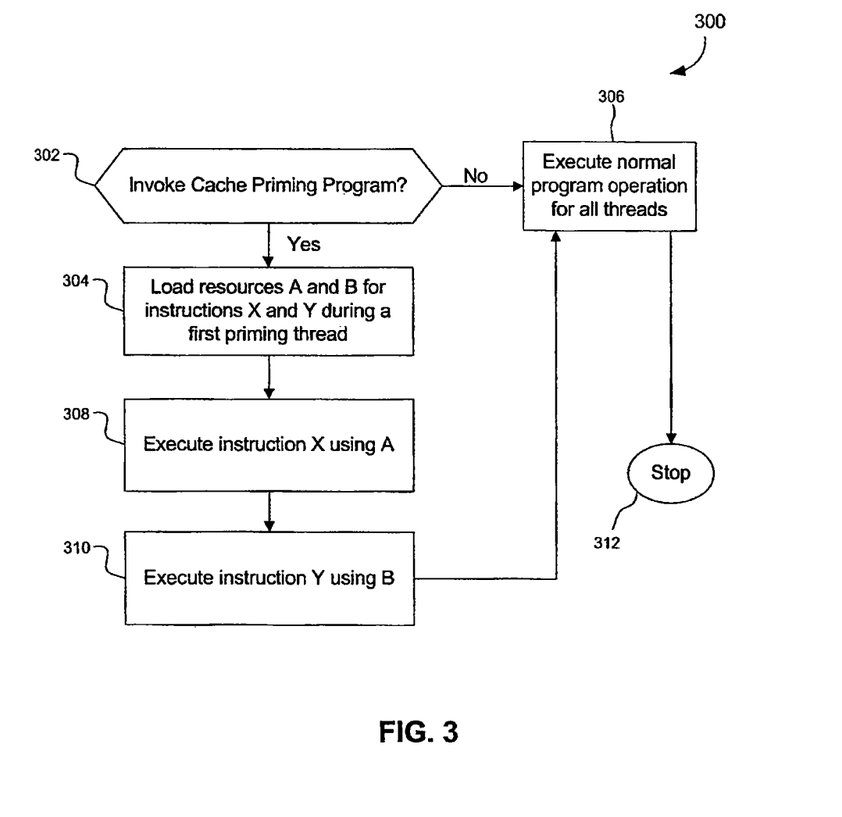
FIG. 3 illustrates a flowchart for implementing a cache priming program, according to an embodiment of the invention.

FIG. 3 illustrates a flowchart 300 showing steps for carrying out one exemplary embodiment of this invention.

In step 302, the processor decides whether invoking the cache priming program is optimal in a given sequence of program execution. If not, the flow goes to step 306, where normal program execution as described in FIG. 1 is carried out.

If yes, in step 304, the cache is loaded with resources A and B for instructions X and Y, respectively, for a first priming thread during its initial fetch (first, second, or additional ones depending upon a size and number of resources to be loaded).

In step 308, instruction X is executed subsequently using resource A.

After instruction X has completed execution, instruction Y is executed using resource B already present in the cache, as shown in step 310.

While the first priming thread is executing or has completed execution, subsequent threads may execute in a normal fashion, utilizing the cache resources (in this embodiment, A and B), as shown in step 306. Therefore, with an additional fetch operation tacked at the beginning of the fetch and execution cycle of a priming thread (first thread), cache resources are optimally utilized by storing two or more programs (the cache priming program and the normal program(s)) in only slightly more space than it takes to store a normal program only. In step 312, flowchart 300 ends.

In the event that cache misses are unavoidable in all cases, various embodiments of the present invention can be combined with a thread priority mechanism, to further enhance processor performance by giving special priority to the first thread of the cache priming program. That is a cache priming mechanism can also be programmed to run the first program with a higher scheduling priority than older threads. Therefore, not only is it advantageous to have a cache priming program that minimizes latency when resources are not already in the cache, it is even more advantageous to start incurring such a latency as early as possible even before older threads have completed executing. Such thread prioritization is described in more details in a co-pending patent application, titled "Thread Sequencing For Multi-Threaded Processor With Instruction Cache," filed Jul. 31, 2007, application Ser. No. 11/882,305, and incorporated in its entirety by reference herein. An exemplary scenario when such parallel threading can be incorporated with various embodiments of the cache priming program is described below.

In the case of parallel threads, after a first thread (also referred to as the "priming thread") has been executed, a subsequent thread may use the resulting output state of the cache. In other words, the priming thread (such as program 1/thread 1 in the example) can pre-load the cache with data required for subsequent threads. Loading the cache with program 3 or thread 3 variable(s) while program 2 instruction(s) are being pre-fetched leads to a better utilization of the cache and a reduction in the latency of program execution.

In another exemplary embodiment, the invention can be implemented in the following way. For a first thread, executing, for example, a shader program, the processor may start at a time instance when the instruction is normally scheduled to execute. However, for subsequent threads, the processor may skip and/or delay execution of the first instruction of the subsequent thread. In this way the first thread ( or the "priming thread"), can jump to a different set of instructions in a different part of a program's code from subsequent threads associated with that program. Alternatively, such a jump can be performed between altogether different programs. This way, the priming thread will load the cache with context of one or more subsequent threads and this will result in a faster execution of multiple programs in the processor.

Various embodiments of the present invention are useful in a multi-threaded process scenario where processes that do greedy scheduling of older threads first can be speeded up by using information from older threads and/or multiple threads used in a program.

Figure 4:
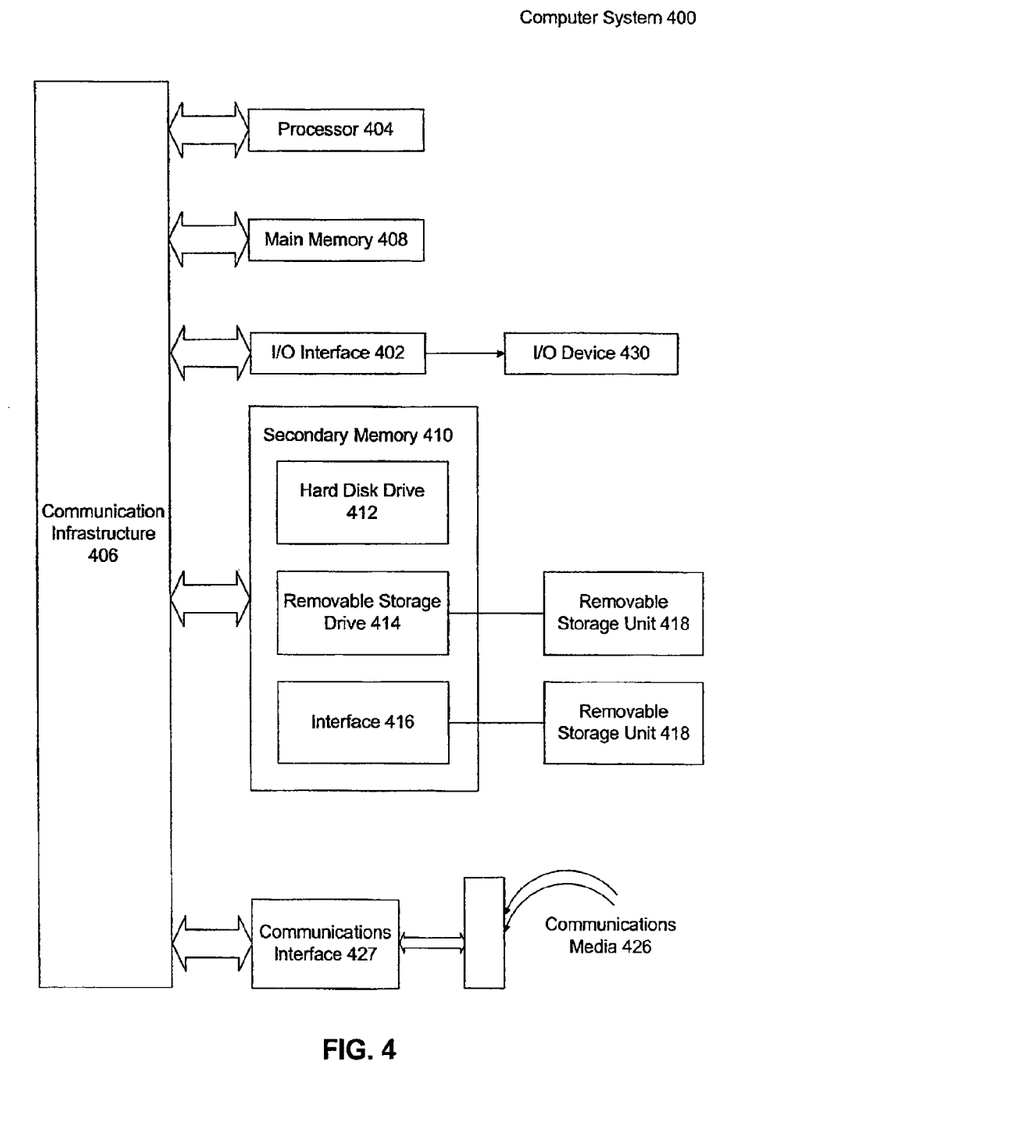
FIG. 4 is a block diagram illustrating an exemplary computing environment of an embodiment of the invention.

In an embodiment of the present invention, the system and components of the present invention described herein are implemented using well known computer systems, such as a computer system 400 shown in FIG. 4. Computer system 400 can be any commercially available and well known computer capable of performing the functions described herein, such as computers available from International Business Machines, Apple, Silicon Graphics Inc., Sun, HP, Dell, Compaq, Digital, Cray, etc. Alternatively, computer system 400 can be a custom built system.

Computer system 400 includes one or more processors (also called central processing units, or CPUs), such as a processor 404. This processor may be a multi-threaded graphics processor in an embodiment of the invention. Such graphics processors are available, for example, from Advance Micro Devices of Sunnyvale, Calif. Processor 404 is connected to a communication infrastructure or bus 406. Computer system 400 also includes a main or primary memory 408, such as random access memory (RAM). Primary memory 408 has stored therein control logic (computer software), and data. Additionally or alternatively, computer system 400 can include other forms of memory or memory units, such as flip-flops, registers, or similar memory devices well-known to those skilled in the art used to store, for example, outputs of various executed programs or processes.

Computer system 400 also includes one or more secondary memory storage devices 410 (which can also be considered as memory units). Secondary storage devices 410 include, for example, a hard disk drive 412 and/or a removable storage device or drive 414. Removable storage drive 414 represents, for example, a magnetic tape drive, a compact disk drive, an optical storage device drive, etc.

Removable storage drive 414 interacts with a removable storage unit 418. Removable storage unit 418 includes a computer useable or readable storage medium having stored therein computer software (control logic) and/or data. The logic of the invention as illustrated in FIGS. 1-4, for example, may be embodied as control logic. Removable storage unit 418 represents, for example, a floppy disk, a magnetic tape, compact disk, DVD, optical storage disk, or any other computer data storage device. Removable storage drive 414 reads from and/or writes to removable storage unit 418 in a well known manner.

Computer system 400 may also include input/output/display devices 430, such as monitors, keyboards, pointing devices, etc.

Computer system 400 further includes a communications or network interface 427. Network interface 427 enables the computer system 400 to communicate with remote devices. For example, network interface 427 allows computer system 400 to communicate over communication networks or mediums 426 (representing a form of a computer useable or readable medium), such as LANs, WANs, the Internet, etc. Network interface 427 may interface with remote sites or networks via wired or wireless connections.

Control logic may be transmitted to and from computer system 400 via communication medium 426. More particularly, computer system 400 may receive and transmit carrier waves (electromagnetic signals) modulated with control logic via communication medium 426.

Any apparatus or manufacture comprising a computer useable or readable medium having control logic (software) stored therein is referred to herein as a computer program product or program storage device. This includes, but is not limited to, computer system 400, main memory 408, hard disk 412, and removable storage unit 418. Carrier waves can also be modulated with control logic. Such computer program products, having control logic stored therein that, when executed by one or more data processing devices can cause such data processing devices to operate as described herein, represent embodiments of the invention.

Such control logic and instructions can be written in a hardware description language such as VHDL, available publically. Such hardware description language instructions when executed can be used to configure a manufacturing process to manufacture a second processor adapted to perform the method described above.

The invention can work with software, hardware, and/or operating system implementations other than those described herein. Any software, hardware, and operating system implementations suitable for performing the functions described herein can be used.

It is to be appreciated that the Detailed Description section, and not the Abstract section, is intended to be used to interpret the claims. The Abstract section may set forth one or more but not all exemplary embodiments of the present invention as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method, comprising:
   determining whether an instruction sequence includes a first thread of a first normal program, wherein the first normal program comprises:
      a fetch of a first memory resource,
      a first instruction which, when executed, uses the first memory resource,
      a fetch of a second memory resource, and
      a second instruction which, when executed, uses the second memory resource;
   in response to the determining being positive, executing a cache priming program for the first thread of the first normal program, wherein a memory stores further instructions for executing the cache priming program for the first thread of the first normal program at a higher scheduling priority compared to an older thread, comprising:
      fetching, at a beginning of the cache priming program, the first and second memory resources used in the execution of the first and second instructions of the first thread of the first normal program from a memory device;
      loading the first and second memory resources into a cache, wherein at least one of the first and second memory resources loaded into the cache from the cache priming ram are used b a subsequent thread in the first normal program;
      executing the first instruction using the first memory resource; and
      executing the second instruction using the second memory resource;
   delaying execution of a subsequent thread in the first normal program wherein the cache priming program jumps to a second normal program; and
   executing the cache priming program for a first thread of the second normal program upon a positive determination of the first thread, wherein the first thread of the second normal program comprises:
      a fetch of a third memory resource,
      a third instruction which, when executed, uses the third memory resource,
      a fetch of a fourth memory resource, and
      a fourth instruction which, when executed, uses the fourth memory resource.

2. The method of claim 1, wherein the executing the cache priming program occurs when the first memory resource needed by the first thread of the first normal program has not yet been loaded into the cache, when the first memory resource required for the first thread of the first normal program execution changes, and/or when the first thread of the first normal program changes.

3. The method of claim 1, wherein the subsequent thread uses the at least one of the first and second memory resources during execution of the cache priming program after the at least one of the first and second memory resources is loaded into the cache, or after execution of the cache priming program.

4. A system, comprising:
   a processor;
   a memory in communication with the processor, the memory configured to store a plurality of processing instructions configured to direct the processor to:
      determine whether an instruction sequence includes a first thread of a first normal program, wherein the first normal program comprises:
         a fetch of a first memory resource,
         a first instruction which, when executed, uses the first memory resource,
         a fetch of a second memory resource, and
         a second instruction which, when executed, uses the second memory resource;
      in response to the determining being positive, execute a cache priming program for the first thread of the first normal program, wherein the memory stores further instructions for directing the processor to execute the cache priming program for the first thread of the first normal program at a higher scheduling priority compared to an older thread, the processor further directed to:
         fetch, at a beginning of the cache priming program, the first and second memory resources used in the execution of the first and second instructions of the first thread of the first normal program from a memory device;
         load the first and second memory resources into a cache, wherein at least one of the first and second memory resources loaded into the cache from the cache priming program are used by a subsequent thread in the first normal program;
         execute the first instruction using the first memory resource;
         and
         execute the second instruction using the second memory resource;
      delay execution of a subsequent thread in the first normal program wherein the cache priming program jumps to a second normal program; and
      execute the cache priming program for a first thread of the second normal program upon a positive determination of the first thread, wherein the first thread of the second normal program comprises:
         a fetch of a third memory resource,
         a third instruction which, when executed, uses the third memory resource,
         a fetch of a fourth memory resource, and a fourth instruction which, when executed, uses the fourth memory resource.

5. The system of claim 4, wherein the subsequent thread uses the at least one of the first and second memory resources during execution of the cache priming program after the at least one of the first and second memory resources is loaded into the cache, or after execution of the cache priming program.

6. The system of claim 4, wherein the execution of the cache priming program occurs when the first memory resource requested by the first thread of the first normal program has not yet been loaded into the cache, when the first memory resource requested for the first thread of the first normal program execution changes, and/or when the first thread of the first normal program changes.

7. A non-transitory computer storage medium storing a computer program having instructions, execution of which by one or more processors cause the one or more processors to perform operations comprising:
   determining whether an instruction sequence includes a first thread of a first normal program, wherein the first normal program comprises:
   a fetch of a first memory resource,
   a first instruction which, when executed, uses the first memory resource,
   a fetch of a second memory resource, and
   a second instruction which, when executed, uses the second memory resource;
   in response to the determining being positive, executing a cache priming program for the first thread of the first normal program, wherein a memory stores further instructions for executing the cache priming program for the first thread of the first normal program at a higher scheduling priority compared to an older thread, comprising:
   fetching, at a beginning of the cache priming program, the first and second memory resources used in the execution of the first and second instructions of the first thread of the first normal program from a memory device;
   loading the first and second memory resources into a cache, wherein at least one of the first and second memory resources loaded into the cache from the cache priming program are used by a subsequent thread in the first normal program;
   executing the first instruction using the first memory resource; and
   executing the second instruction using the second memory resource;
   delaying execution of a subsequent thread in the first normal program wherein the cache priming program jumps to a second normal program; and
   executing the cache priming program for a first thread of the second normal program upon a positive determination of the first thread, wherein the first thread of the second normal program comprises:
   a fetch of a third memory resource,
   a third instruction which, when executed, uses the third memory resource,
   a fetch of a fourth memory resource, and
   a fourth instruction which, when executed, uses the fourth memory resource.

8. The non-transitory computer storage medium of claim 7, wherein the subsequent thread uses the at least one of the first and second memory resources during execution of the cache priming program after the at least one of the first and second memory resources is loaded into the cache, or after execution of the cache priming program.

9. The non-transitory computer storage medium of claim 7, wherein the executing the cache priming program occurs when the first memory resource requested by the first thread of the first normal program has not yet been loaded into the cache, when the first memory resource requested for the first thread of the first normal program execution changes, and/or when the first thread of the first normal program changes.

* * * * *

UNITED STATES PATENT AND TRADEMARK OFFICE
CERTIFICATE OF CORRECTION

| | | |
|---|---|---|
| PATENT NO. | : 9,015,720 B2 | Page 1 of 1 |
| APPLICATION NO. | : 12/349227 | |
| DATED | : April 21, 2015 | |
| INVENTOR(S) | : Brown et al. | |

It is certified that error appears in the above-identified patent and that said Letters Patent is hereby corrected as shown below:

IN THE CLAIMS

Claim 1, column 7, line 54, change "ram" to -- program --.

Claim 1, column 7, line 54, change "b" to -- by --.

Signed and Sealed this
Eleventh Day of August, 2015

Michelle K. Lee
*Director of the United States Patent and Trademark Office*